US011126693B2

(12) United States Patent
Moukharski

(10) Patent No.: US 11,126,693 B2
(45) Date of Patent: Sep. 21, 2021

(54) METHOD AND DEVICE FOR REDUCING NOISE IN A MODULATED SIGNAL

(71) Applicant: COMMISSARIAT A L'ENERGIE ATOMIQUE ET AUX ENERGIES ALTERNATIVES, Paris (FR)

(72) Inventor: Iouri Moukharski, Briis Sous Forges (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 304 days.

(21) Appl. No.: 16/097,022

(22) PCT Filed: Apr. 27, 2017

(86) PCT No.: PCT/EP2017/060087
§ 371 (c)(1),
(2) Date: Oct. 26, 2018

(87) PCT Pub. No.: WO2017/186861
PCT Pub. Date: Nov. 2, 2017

(65) Prior Publication Data
US 2019/0138572 A1 May 9, 2019

(30) Foreign Application Priority Data

Apr. 28, 2016 (FR) ........................... 1653787

(51) Int. Cl.
*G06F 17/18* (2006.01)
*H04L 27/14* (2006.01)
(Continued)

(52) U.S. Cl.
CPC ............... *G06F 17/18* (2013.01); *H04B 1/10* (2013.01); *H04L 27/14* (2013.01); *H04L 27/22* (2013.01); *H04L 27/2334* (2013.01)

(58) Field of Classification Search
CPC .......... H04B 1/10; H04L 27/14; H04L 27/22; H04L 27/2334; H04L 27/06; G06F 17/18
See application file for complete search history.

(56) References Cited

U.S. PATENT DOCUMENTS 7,046,811 B1 * 5/2006 Wildhagen ........... H03D 1/2236
375/254
2001/0023175 A1 * 9/2001 Kroeger ................. H04H 40/27
455/61

(Continued)

FOREIGN PATENT DOCUMENTS

EP       1 315 303 A1    5/2003

OTHER PUBLICATIONS

Hill et al.."Techniques For Detecting & Characterising Covert Communication Signals", European Conference on Security and Detection, 1997. ECOS 97., London, UK, 1997, pp. 57-60 (Year: 1997).*

(Continued)

*Primary Examiner* — Alessandro V Amari
*Assistant Examiner* — Christian T Bryant
(74) *Attorney, Agent, or Firm* — Pillsbury Winthrop Shaw Pittman LLP

(57) ABSTRACT

A method for reducing noise in a modulated electrical signal having a carrier frequency, includes acquiring in the time domain the modulated signal so as to obtain a plurality of pieces of the modulated signal; calculating, by transformation in the frequency domain, a spectrum of each piece of the modulated signal, the spectrum including an upper sideband extending over a range of frequencies greater than the carrier frequency, and a lower sideband extending over a range of frequencies lower than the carrier frequency, the spectrum including first values belonging to the upper sideband and second values belonging to the lower sideband; calculating a power spectrum for each piece of the modulated signal (Continued)

from the first values of the upper sideband and the second values of the lower sideband of the spectrum of each piece of the modulated signal; calculating an average of the power spectra.

10 Claims, 3 Drawing Sheets

(51) Int. Cl.
    *H04L 27/22*     (2006.01)
    *H04B 1/10*     (2006.01)
    *H04L 27/233*     (2006.01)

(56) References Cited

U.S. PATENT DOCUMENTS

| | | | | |
|---|---|---|---|---|
| 2006/0227890 A1* | 10/2006 | Koga | ...................... | H04B 3/54 375/260 |
| 2011/0149428 A1* | 6/2011 | Franca-Neto | ........ | G11B 5/6029 360/75 |
| 2011/0183637 A1* | 7/2011 | Flickinger | .......... | H04B 17/0085 455/150.1 |
| 2011/0288823 A1* | 11/2011 | Gupta | ...................... | H04B 1/38 702/189 |
| 2014/0235192 A1* | 8/2014 | Purnhagen | ............... | H04B 1/10 455/296 |

OTHER PUBLICATIONS

Gruber, "Synchronous Detection of AM Signals: What Is It and How Does It Work." Swling.com, Aug. 2009 (Year: 2009).*

International Search Report as issued in International Patent Application No. PCT/EP2017/060087, dated May 31, 2017.

Hill, P. C. J., et al., "Techniques for Detecting & Characterising Covert Communication Signals," Security and Detection, 1997, European Conference in London, Apr. 1997, XP006507528, pp. 57-60.

* cited by examiner

METHOD AND DEVICE FOR REDUCING NOISE IN A MODULATED SIGNAL

CROSS REFERENCE TO RELATED APPLICATIONS

This application is the U.S. National Stage of PCT/EP2017/060087, filed Apr. 27, 2017, which in turn claims priority to French Patent Application No. 1653787 filed Apr. 28, 2016, the entire contents of all applications are incorporated herein by reference in their entireties.

TECHNICAL FIELD OF THE INVENTION

The technical field of the invention is that of signal processing and more specifically that of reducing the noise level in an electrical signal.

TECHNOLOGICAL BACKGROUND OF THE INVENTION

A characteristic problem of the measurement of an electrical signal concerns the presence of noise, notably coming from the source of the signal itself, or instead intrinsic to the amplifiers, present for example in the signal transmission paths. Noise is particularly bothersome when the signal to measure is of low amplitude, of the order of magnitude of the noise. This problem is encountered very widely for measurements having high sensitivity, as in measurements of turbulence with a sensor (Pitot tube or other) with capacitive, piezoresistive or optical reading, or for the transmission of data through paths comprising noise.

Different noise level reduction methods exist, a first method is that of averaging in the time domain, known as "time averaging". This method consists in sampling the signal to measure a large number of times. The start of a sampling sequence is triggered by a reference signal synchronised with the signal to measure. The samples of a sequence form a sampled signal, or "piece", of the original signal.

The sampled signals, and thus the noise that they contain, are next averaged. The power of the noise decreases proportionally to the inverse of the number of averaged pieces; on the other hand the signal is not affected by averaging. However, this first method requires repeated excitations of the system to measure and a well-defined reference signal.

A second noise level reduction method is that of averaging in the frequency domain, known as "spectrum averaging". In the same way as described previously, the signal to measure is sampled a large number of times. Next, a spectrum of each sampled signal is calculated by transformation in the frequency domain. It is generally a discrete Fourier transform, also called DFT. Finally, the set of spectra is averaged.

These operations are carried out a first time with the signal to measure and a second time without the signal. Two average spectra are then obtained, the difference between these two spectra corresponding to the spectrum of the signal to measure. This second method thus requires the possibility of carrying out the measurements with and without the signal, that is to say being able to activate and de-activate the signal in a controlled manner. In theory, an average calculated over a long duration enables measurements having good resolution. However, the resolution is in reality limited by drift, notably of the levels of noise and gains of the amplifiers, when the signal is activated and when the signal is de-activated.

A third method consists in carrying out a cross-correlation between the outputs of different amplification paths connected to the source of the signal. Indeed, the noise coming from the amplifiers comprises a non-correlated part, including voltage noise which is specific to each amplifier and invisible for the other amplifiers, and a correlated part, including current noise applied to the source by the counter-reaction of the amplifier and thus visible by all the amplifiers.

Cross-correlation makes it possible to reduce the noise level by cancelling the non-correlated part of the noise, which only provides a partial solution. Furthermore, when current noise is preponderant, cross-correlation can in fact reduce the signal to noise ratio since the current noises of several amplifiers contribute to the result. In addition, if the source of the signal is a sensor, this method is not useful either against the intrinsic noise of the sensor, which is also seen by all the paths.

SUMMARY OF THE INVENTION

The method according to the invention aims to resolve the problems that have been described by proposing a method for reducing the noise level in an electrical signal, and in particular in a modulated electrical signal, which is not necessarily synchronised with a reference signal. The present invention also aims to reduce the current noise coming from the counter-reaction of an amplifier as well as the intrinsic noise of a sensor, such as thermal noise.

A first aspect of the invention thus relates to a method for reducing noise in a modulated electrical signal having a carrier frequency, the method comprising the following steps:
  acquiring in the time domain the modulated signal so as to obtain a plurality of pieces of the modulated signal;
  calculating, by transformation in the frequency domain, a spectrum of each piece of the modulated signal, the spectrum comprising an upper sideband extending over a range of frequencies greater than the carrier frequency, and a lower sideband extending over a range of frequencies lower than the carrier frequency, the spectrum comprising first values belonging to the upper sideband and second values belonging to the lower sideband;
  calculating a power spectrum for each piece of the modulated signal from the first values of the upper sideband and the second values of the lower sideband of the spectrum of said each piece of the modulated signal;
  calculating an average of the power spectra.

The modulated signal comprises a signal component, which corresponds to the signal of interest, and a noise component, which is generally not desired. These signal and noise components are located in the spectrum of the modulated signal, that is to say in the upper sideband and in the lower sideband. The signal component in the upper sideband and the signal component in the lower sideband are perfectly correlated. On the other hand, the noise components in these sidebands are generally not correlated. By calculating the power spectra from the values of the spectrum of the modulated signal taken in the upper sideband and in the lower sideband, then by averaging these power spectra, the non-correlated noise components are eliminated. It is thereby possible to reduce the noise level while conserving the signal of interest.

In a preferential embodiment, the power spectrum of each piece of the modulated signal comprises a set of values, each value of the power spectrum being calculated by multiplication of a first value of the upper sideband and a second value of the lower sideband situated at equal distance from the carrier frequency. In other words, for a carrier frequency $f_0$, the value that the power spectrum takes at any frequency $\delta f$ is calculated by multiplying the values taken by the spectrum at the frequency $f_0+\delta f$ and at the frequency $f_0-\delta f$.

In an alternative embodiment, the step of calculating the power spectrum of each piece of the modulated signal comprises the following operations:
  calculating a unilateral spectrum for each piece of the modulated signal by adding together the first values of the upper sideband and the second values of the lower sideband of the spectrum of said each piece of the modulated signal;
  squaring the unilateral spectrum.

In other words, for a carrier frequency $f_0$, the value that the power spectrum takes at any frequency $\delta f$ is calculated by squaring the result of the sum of the values taken by the spectrum at the frequency $f_0+\delta f$ and at the frequency $f_0-\delta f$.

Preferably, the method for reducing noise according to the first aspect of the invention comprises a step of synchronous detection of the modulated signal.

Advantageously, the modulated signal has a plurality of carrier frequencies, the spectrum of each piece of the modulated signal comprising an upper sideband and a lower sideband for each carrier frequency of the modulated signal, a plurality of power spectra being calculated for each piece of the modulated signal from the values belonging to two distinct sidebands of the spectrum of said each piece of the modulated signal. Thus, at equal number of pieces of the modulated signal, it is possible to improve the signal to noise ratio by calculating a larger number of power spectra.

For example, for a modulated signal having two carrier frequencies, the spectrum of the modulated signal comprises four sidebands. Two different sidebands being able to be correlated, the number of power spectra to average is multiplied by 6. Thus the signal to noise ratio is substantially improved.

The modulated signal results for example from an amplitude modulation, a frequency modulation or a phase modulation.

A second aspect of the invention relates to a device for reducing noise in a modulated electrical signal having a carrier frequency, the device comprising:
  means for acquiring in the time domain the modulated signal so as to obtain a plurality of pieces of the modulated signal;
  means for calculating, by transformation in the frequency domain, a spectrum of each piece of the modulated signal, the spectrum comprising an upper sideband extending over a range of frequencies greater than the carrier frequency, and a lower sideband extending over a range of frequencies lower than the carrier frequency, the spectrum comprising first values belonging to the upper sideband and second values belonging to the lower sideband;
  means for calculating a power spectrum for each piece of the modulated signal from the first values of the upper sideband and the second values of the lower sideband of the spectrum of said each piece of the modulated signal;
  means for calculating an average of the power spectra.

Preferably, the noise reduction device according to the second aspect of the invention comprises means for synchronous detection of the modulated signal.

Advantageously, the acquisition means comprise several acquisition paths, each acquisition path being dedicated to a carrier frequency of the modulated signal.

The invention and its different applications will be better understood on reading the description that follows and by examining the figures that accompany it.

BRIEF DESCRIPTION OF THE FIGURES

The invention and its different applications will be better understood on reading the description that follows and by examining the figures that accompany it, among which.

The figures are only presented for indicative purposes and in no way limit the invention.

For greater clarity, identical or similar elements are marked by identical reference signs in all of the figures.

DETAILED DESCRIPTION OF AN EMBODIMENT OF THE INVENTION

The aim of the present invention is to propose a method intended to reduce the noise level in an electrical signal. This method applies particularly to situations in which a useful signal modulates a carrier signal. The present invention is also particularly efficient for unpredictable signals, that is to say signals that are not synchronised with a reference signal.

Figure 1:
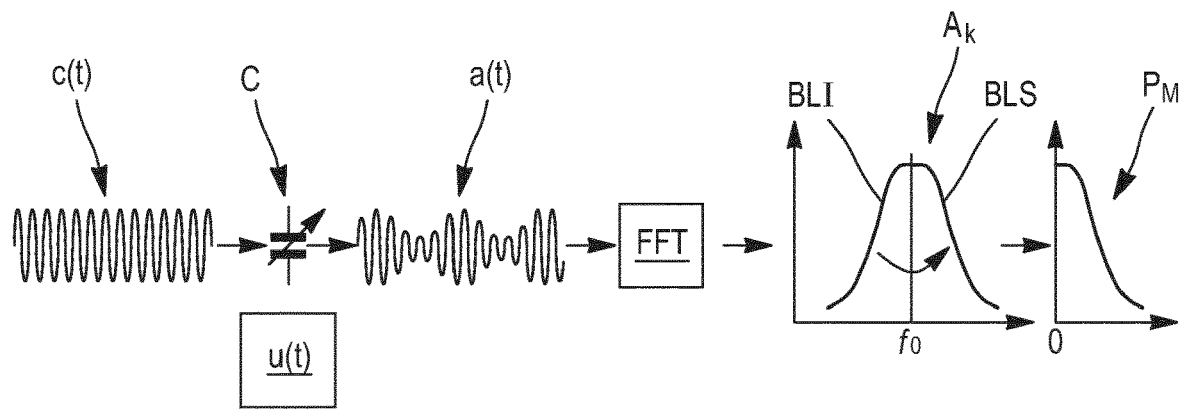
FIG. 1 represents a schematic diagram of a method for reducing noise in a modulated signal, according to a preferential embodiment of the invention.
Figure 2:
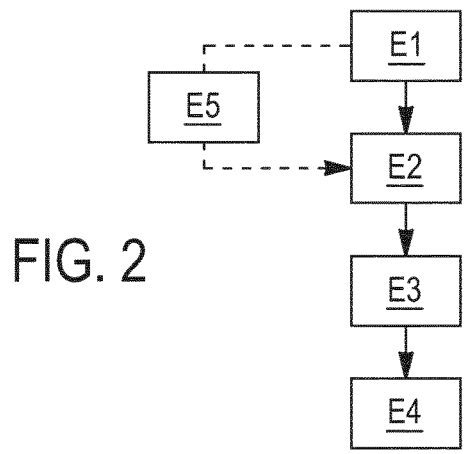
FIG. 2 represents a functional diagram of the preferential embodiment of the method of the FIG. 1.

A basic diagram of a preferential embodiment of the method of the invention is illustrated in FIG. 1. A functional diagram of this preferential embodiment is represented in FIG. 2. FIGS. 1 and 2 are described jointly.

FIG. 1 shows a modulated electrical signal $a(t)$ resulting from a modulation of a carrier signal $c(t)$ by a useful signal $u(t)$, further called modulating signal $u(t)$. This type of modulation is notably encountered in electronics, for example when a physical quantity is measured by a sensor C to which is applied the carrier signal $c(t)$, as illustrated in FIG. 1. In this case, the useful signal $u(t)$ represents variations in the physical quantity measured.

Indeed, the variations in the physical quantity modify a capacitance, resistance, inductance, position, pressure, or light intensity value of the sensor, according to the type of sensor chosen, which produces the modulated signal $a(t)$ at the output of the sensor C (represented by a variable capacitance in FIG. 1). It is to be noted that a variation in position, a variation in pressure or a variation in light intensity is easily convertible into a variation in capacitance, resistance or inductance.

Signal modulation is also frequently used in telecommunications, notably for transmitting information, initially contained in the useful signal u(t), inside the carrier signal c(t), which may be more easily transmitted physically.

The modulated signal a(t), which lies in the time domain, is digitized during an acquisition step E1. To do so, the modulated signal a(t) is sampled, preferably at constant pitch, that is to say with a fixed sampling frequency. The sampling of the modulated signal a(t) is carried out on a finite number, noted N in the remainder of the description, of time intervals. The latter generally have identical durations. The samples acquired in each time interval form a numerical representation k, also called piece k, of the modulated signal a(t), k being an integer comprised between 1 and N.

A spectrum $A_k$ of each piece k of the modulated signal a(t) is next calculated, during a step E2, by transformation in the frequency domain. The pieces of the modulated signal a(t) are not continuous signals but successions of discrete values. Hence, the transformation in the frequency domain is for example a discrete Fourier transform, also called DFT. The discrete Fourier transform may be implemented using an FFT (fast Fourier transform) algorithm.

The carrier signal c(t) has a carrier frequency $f_0$. The spectrum $A_k$ of the modulated signal a(t) comprises an upper sideband BLS and a lower sideband BLI arranged on either side of the carrier frequency $f_0$. The upper sideband BLS extends over a range of frequencies greater than or equal to the carrier frequency $f_0$, and the lower sideband BLI extends over a range of frequencies less than or equal to the carrier frequency $f_0$. The upper sideband BLS and the lower sideband BLI are symmetrical with respect to the carrier frequency $f_0$.

The modulation of the carrier signal c(t) by the useful signal u(t) may be an amplitude modulation, a frequency modulation, a phase modulation or any other type of modulation producing two sidebands in the frequency domain.

For example, the amplitude modulation of a monochromatic sinusoidal carrier signal c(t) of carrier frequency $f_0$ by a useful signal u(t) of frequency $f_s$, creates, in theory, an upper sideband BLS at the frequency $f_0+f_s$ and a lower sideband BLI at the frequency $f_0-f_s$. In this theoretical case, the sidebands BLS, BLI are peaks, each being situated at a single frequency.

The spectrum $A_k$ of the modulated signal a(t) comprises a first set of values, which are hereafter called "first values", belonging to the upper sideband BLS and a second set of values, which are hereafter called "second values", belonging to the lower sideband BLI.

After the step E2 of calculating the spectra $A_k$ of the pieces of the modulated signal a(t), a power spectrum is calculated, during a step E3, for each piece of the modulated signal a(t).

In this preferential embodiment, the values of the power spectrum of a piece k of the modulated signal a(t) are calculated by multiplying two by two the first values of the upper sideband BLS by the second values of the lower sideband BLI of the spectrum $A_k$ of this piece k. These multiplications are carried out in a symmetrical manner with respect to the carrier frequency $f_0$, that is to say that the value of the power spectrum at a given frequency $\delta f$ is the result of the multiplication of the value of the spectrum at the frequency $f_0+\delta f$ by the value of the spectrum at the frequency $f_0-\delta f$. This type of calculation is also called cross-correlation between the upper sideband and the lower sideband.

An average of the power spectra is next calculated during a step E4. An average power spectrum is thereby obtained. From a mathematical viewpoint, the average power spectrum $P_M$ is calculated according to the following equation:

$$P_M(\delta f) = \langle A_k(f_0-\delta f) \cdot A_k(f_0+\delta f) e^{-i \cdot \arg(A_k(f_0))} \rangle \quad (1)$$

where $f_0$ is the carrier frequency, $\delta f$ is any frequency, $A_k$ is the Fourier transform of a piece k of the modulated signal a(t), k being an integer comprised between 1 and N, N being the number of pieces of the modulated signal a(t) acquired, and the chevrons $\langle \ \rangle$ symbolise the calculation of the arithmetic average of the power spectra of the N pieces of the modulated signal a(t).

The phase of the Fourier transform of the modulated signal a(t) is random and depends on the moment at which the acquisition starts. To compensate this, the term $e^{-i \cdot \arg(F(f_0))}$ in which $\arg(F(f_0))$ is the phase of the carrier signal c(t), is introduced into equation (1).

The modulated signal a(t) comprises a signal part s(t) and a noise part b(t) such that:

$$a(t) = s(t) + b(t) \quad (2)$$

In this case, the spectra $A_k$ of the modulated signal a(t) each comprise a signal part $S_k$ and a noise part $B_k$ such that:

$$A_k = S_k + B_k \quad (3)$$

The signal parts $S_k$ of the sidebands BLS, BLI of a same spectrum $A_k$ are perfectly correlated whereas the noise parts $B_k$ of these same sidebands BLS, BLI are generally not correlated. This applies to all additive noise sources such as current and voltage noise sources of amplifiers, present notably in the acquisition or transmission paths of the signals, or instead the additive noise of the sensor C.

Thus, thanks to the invention, the signal part s(t) of the modulated signal a(t) is preserved and the noise part b(t) is eliminated, with the exception of noise coming from non-linear noise sources. Consequently, by averaging over a sufficiently long duration, it is theoretically possible to lower the noise level down to a desired value. However, in practice, cross-correlation of the noise part b(t) of the modulated signal a(t) decreases with the number of pieces N used for the calculation of the average of the power spectra, and does so until reaching a noise level that corresponds to a portion of the initial noise, the noise of this portion being correlated.

For a resistance, it involves what is known as excess noise of the resistance, which is proportional to the voltage applied to the terminals of the resistance and which increases with frequency. The excess noise value, which essentially depends on the technology used to manufacture the resistance, is typically comprised between 1 and $10^{-4}$ µV per volt applied per decade. On the other hand, the capacitances and the inductances do not have known limits, the noise level being able to be continually reduced.

Furthermore, it should be noted that the method according to the invention does not require any reference or triggering signal.

Advantageously, before the acquisition step E2, the modulated signal is subjected to a step E5 of synchronous detection of the modulated signal a(t). Thus, the spectra $A_k$ of the pieces of the modulated signal a(t) are not centred either on the carrier frequency $f_0$ but on the zero frequency. The spectra $A_k$ are shifted from the carrier frequency $f_0$ to 0.

In this case, the upper sideband BLS corresponds to positive frequencies and the lower sideband BLI corresponds to negative frequencies.

At the output of the synchronous detection, a signal in phase i(t) with the carrier signal c(t), also called "in-phase signal", and a signal in phase quadrature q(t) with the carrier signal c(t), that is to say turned by 90°, also called "quadrature signal" are obtained. To be able to calculate a spectrum at negative frequencies, it is important to conserve these two signals in phase and in quadrature.

The step E5 of synchronous detection is for example carried out by multiplying the modulated signal a(t) by $\cos(2\pi f_0 t)$ to obtain the signal in phase, and by $\sin(2\pi f_0 t)$ to obtain the signal in phase quadrature, these two signals next being subjected to a low frequency filtering.

Synchronous detection makes it possible to fix the phase of the Fourier transform of the modulated signal a(t), which facilitates the calculation of the average power spectrum $P_M$. When synchronous detection is used, one works with the complex signal z(t) of the modulated signal a(t) obtained from the following equation:

$$z(t)=i(t)+j \cdot q(t) \quad (4)$$

The average power spectrum $P_M$ is then calculated according to the following equation, a variant of equation (1):

$$P_M(\delta f)=\langle Z_k(-\delta f) \cdot Z_k(+\delta f)\rangle \quad (1')$$

where $Z_k$ is the Fourier transform of a piece k of the complex signal z(t). It is to be noted that, due to the synchronous detection, the frequencies $f_0-\delta f$ and $f_0+\delta f$ of the equation (1) become $-\delta f$ and $+\delta f$ because the spectra $Z_k$ of the complex signal z(t) are displaced from the carrier frequency $f_0$ to 0.

In addition, synchronous detection makes it possible to facilitate the calculation of averages, for example carried out by filtering. Indeed, it is very difficult to realise a band pass filter with a narrow band around a high carrier frequency. Conversely, it is very easy to realise a band pass filter with a narrow band around 0.

In an alternative embodiment, the modulated signal a(t) has several carrier frequencies. In this case, the spectra $A_k$ of the pieces of the modulated signal a(t) comprise an upper sideband BLS and a lower sideband BLI with respect to each carrier frequency. Advantageously, several power spectra are calculated for a piece k of the modulated signal a(t) from two distinct sidebands of the spectrum $A_k$ of this piece k. Thus, the reduction in noise is accelerated because for a same number of pieces N of the modulated signal a(t), the number of power spectra to average is increased.

For example, the amplitude modulation of a sinusoidal carrier signal c(t) having two carrier frequencies $f_1$ and $f_2$ by a useful signal u(t) of frequency $f_s$ creates two upper sidebands respectively at the frequencies $f_1+f_s$ and $f_2+f_s$, and two lower sidebands respectively at the frequencies $f_1-f_s$ and $f_2-f_s$. These sidebands may be correlated two by two according to equation (1).

However, when the upper sideband situated at the frequency $f_1+f_s$ is correlated with the upper sideband situated at the frequency $f_2+f_s$, or when the lower sideband situated at the frequency $f_1-f_s$ is correlated with the lower sideband situated at the frequency $f_2-f_s$, it is necessary to consider the complex conjugated value of one of the two sidebands. For each piece k of the modulated signal a(t), it is then possible to obtain up to 6 power spectra by carrying out the following products:

$$A_k(f_1-f_s) \cdot A_k(f_1+f_s) \quad (a)$$

$$A_k(f_1-f_s) \cdot A_k(f_2+f_s) \quad (c)$$

$$A_k(f_1-f_s) \cdot A_k(f_2-f_s) \quad (b)$$

$$A_k(f_2-f_s) \cdot A_k(f_2+f_s) \quad (d)$$

$$A_k(f_2-f_s) \cdot A_k(f_1+f_s) \quad (e)$$

$$A_k(f_1+f_s) \cdot A_k^*(f_2+f_s) \quad (f)$$

where $A_k^*$ is the conjugated spectrum of the spectrum $A_k$.

Indeed, it is sought to obtain the square of a complex value, which is normally calculated by the multiplication of the complex value and its conjugated value (or in mathematical terms: $X \cdot X^*$, where X is a complex value and $X^*$ is its conjugated value). However, the Fourier transform of the modulated signal, for example in amplitude modulation, has the following property:

$$A_k(f_1-f_s)=A_k^*(f_1+f_s)$$

The products (a) and (d) are thus deduced therefrom. Similarly, by considering the two carriers, and by correcting the phase difference between the carriers, this gives:

$$A_k(f_1-f_s)=A_k^*(f_2+f_s)$$

The products (c) and (e) are thus deduced therefrom. Conversely, in order to correlate together the sidebands situated on the same side of the carriers (i.e. the upper sideband sets or the lower sideband sets), it is necessary to take the conjugated value of one of the two complex values to obtain a squaring. The products (b) and (f) are thus deduced therefrom.

Figure 3:
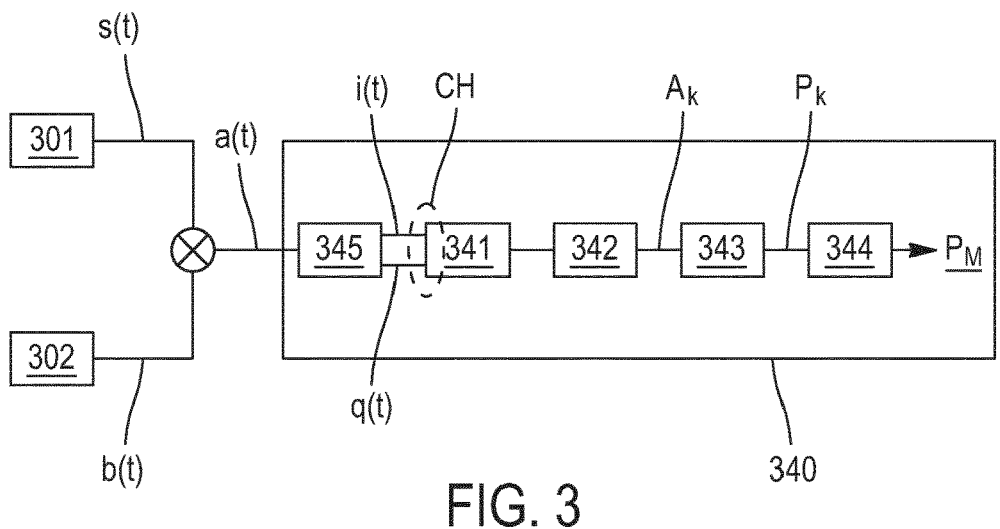
FIG. 3 schematically represents a first example of context of implementation of the method of FIG. 1 for reducing noise in a modulated signal simulated by a signal generator.

FIG. 3 schematically represents a first example of context of implementation of the method of the invention for reducing noise in the modulated signal a(t) of which the signal part s(t) and the noise part b(t) are simulated respectively by a first signal generator 301 and by a second signal generator 302. The first signal generator 301 produces a sinusoidal signal of carrier frequency equal to 50 kHz amplitude modulated by a random noise signal having a band width less than 600 Hz. The second signal generator 302 produces a white noise signal b(t) which is added to the signal part s(t) to form the modulated noised signal a(t). The white noise signal b(t) being a random noise, the modulated noised signal a(t) thereby obtained makes it possible to simulate a useful chaotic signal.

A first embodiment of a noise reduction device 340 according to the invention, able to implement the method described previously, is illustrated in FIG. 3. The device comprises means for acquiring 341 the modulated signal a(t), such as an analogue-digital converter, means for calculating 342 the spectra $A_k$ of the pieces of the modulated signal a(t) by transformation in the frequency domain, means for calculating 343 the power spectrum $P_k$ of each piece of the modulated signal a(t) and means for calculating 344 the average $P_M$ (that is to say the average power spectrum $P_M$) of the power spectra $P_k$. The different calculation means 342, 343, 344 are for example implemented in the form of computer programmes recorded on a memory support.

In this first example, the modulated signal a(t) is sampled with a sampling frequency of 500 kHz, then cut into pieces of a duration equal to 1s.

Advantageously, the noise reduction device 330 comprises means for synchronous detection 345 arranged on an acquisition path CH of the acquisition means 341. The synchronous detection means comprise a first output for the signal in phase i(t) with the carrier signal c(t) and a second output for the signal in phase quadrature q(t) with the carrier signal c(t).

Figure 4:
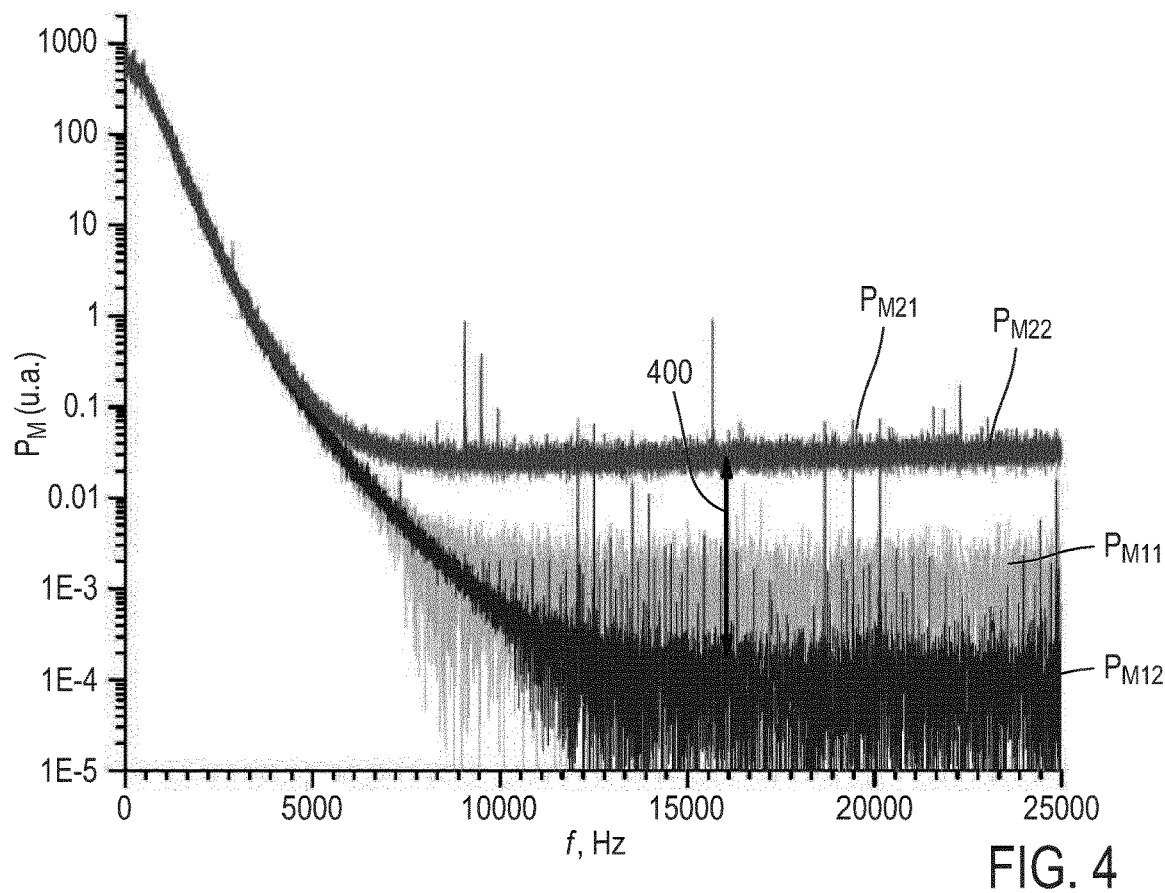
FIG. 4 represents the spectral power of the signal of FIG. 3, measured with the method of the invention and with the method of averaging in the spectral domain of the prior art.

FIG. 4 graphically represents the average power spectrum $P_M$ of the modulated signal a(t), expressed in arbitrary units, as a function of frequency. A first pair of curves $P_{M11}$, $P_{M12}$ is obtained with the method of the invention, the number of pieces N of the modulated signal a(t) used in the calculation of the average being respectively equal to 100 and 14000. A second pair of curves $P_{M21}$, $P_{M22}$ is obtained with the method of averaging in the frequency domain of the prior art, the number of pieces N of the modulated signal a(t) used in the calculation of the average also being respectively equal to 100 and 14000.

It is to be noted that, for low frequencies, the values of the average power spectrum $P_M$ do not change with the number of averaged pieces N (100 or 14000). The white noise value is not modified either by the number of pieces N for the highest frequencies (greater than 5 kHz) when the average power spectrum $P_M$ is calculated with the method of averaging in the frequency domain. However, the noise level of the average power spectrum $P_M$ calculated with the method of the invention continues to decrease while revealing a structure with erroneous amplitude peaks. These peaks are probably due to non-linearities of the acquisition path CH. The noise level decreases with the number of averaged pieces N.

Figure 5:
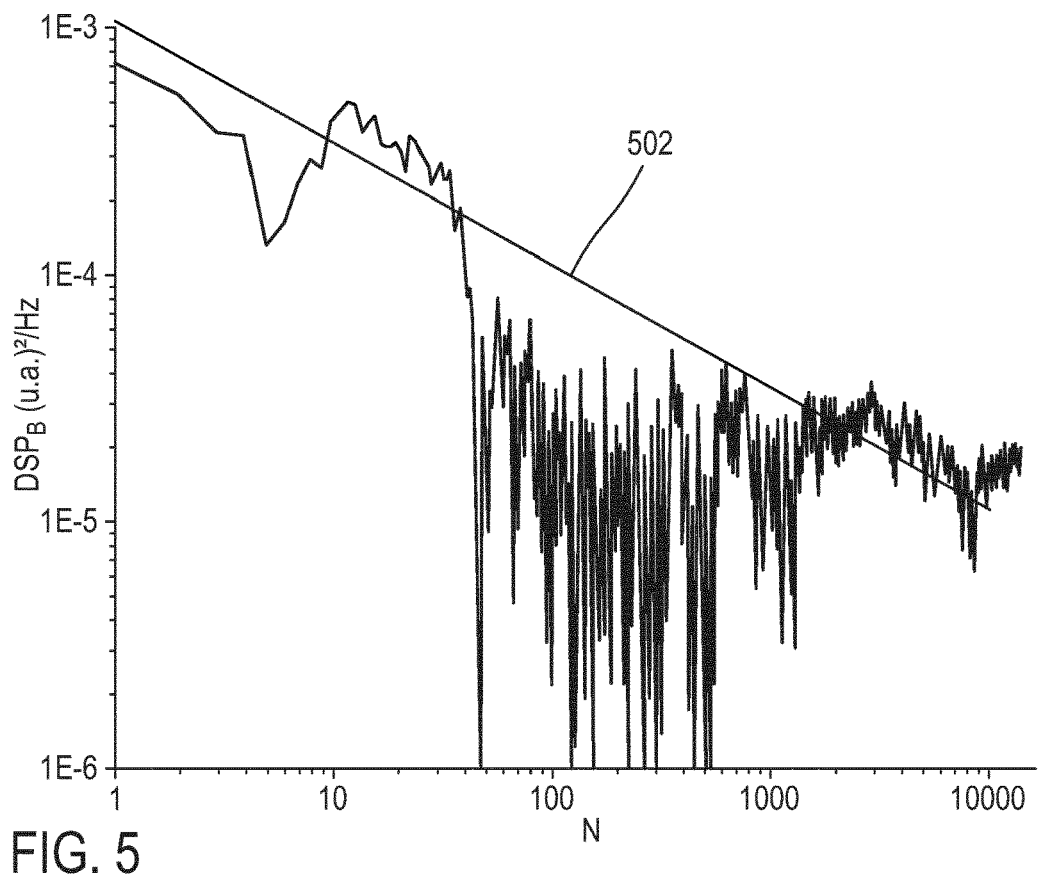
FIG. 5 represents, as a function of the number of pieces used in the calculation of the average, the power of the noise contained in the signal of FIG. 3 measured with the method of the invention.

The spectral density of the noise $DSP_B$ as a function of the number of averaged pieces N is illustrated in FIG. 5. To quantify it, a median value of the average power spectrum $P_M$ is used taken in a frequency range where there are no erroneous amplitude peaks, for example between 17 and 18.5 kHz, as represented in FIG. 4 by the double arrow 400. It may be noted that the method of the invention makes it possible to reduce the noise level by a ratio equal to around 100. The decreasing line 502 shows the theoretical decrease in the noise level which is proportional to $1/\sqrt{N}$.

Figure 6:
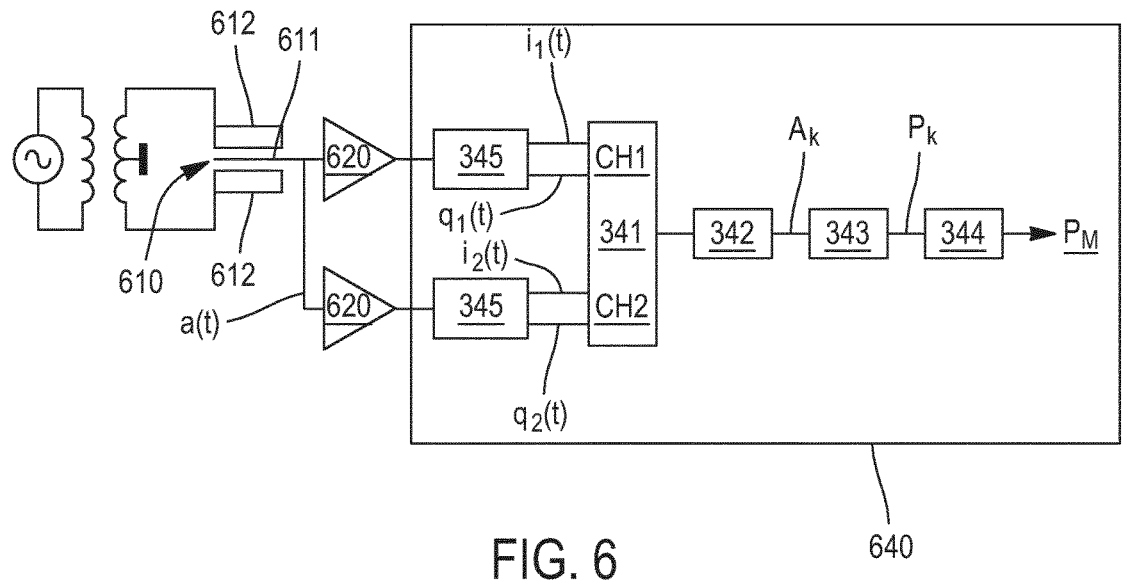
FIG. 6 schematically represents a second example of context of implementation of the method of FIG. 1 for reducing noise in a modulated signal coming from a capacitive sensor installed in a Pitot tube.

FIG. 6 schematically represents a second example of context of implementing the method of the invention for reducing noise in the modulated signal a(t) coming from a Pitot tube comprising a capacitive sensor 610 measuring the dynamic speed of flow of a fluid. The modulated signal a(t) is proportional to a pressure difference between two parts of the tube, one being perpendicular to the flow of the fluid and the other being parallel to the flow of the fluid. This pressure difference, or dynamic pressure, displaces a flexible membrane 611 of the capacitive sensor 610, thereby making a capacitance value vary between the membrane and a pair of electrodes 612 arranged on each side of the membrane 611.

An excitation is applied in antiphase to the electrodes 612 in such a way that when the membrane 611 is at rest, the modulated signal a(t) coming from the membrane 611 is approximately equal to zero. The displacements of the membrane 611 change the amplitude of the modulated signal a(t). It is thus an amplitude modulation.

In this example, two carrier frequencies $f_1$ and $f_2$, as well as two amplifiers 620 are used, in order to calculate the power spectra from 4 sidebands. FIG. 6 shows a second embodiment of a noise reduction device 640 in which the acquisition 341 comprises a first acquisition path CH1 dedicated to the carrier frequency $f_1$, and on a second acquisition path CH2 dedicated to the carrier frequency $f_2$. Each acquisition path CH1, CH2 is equipped with synchronous detection means 345 at the output of which are obtained the signals in phase $i_1(t)$ and in phase quadrature $q_1(t)$ with the modulated signal a(t) for the carrier frequency $f_1$, and the signals in phase $i_2(t)$ and in phase quadrature $q_2(t)$ with the modulated signal a(t) for the carrier frequency $f_2$.

Figure 7:
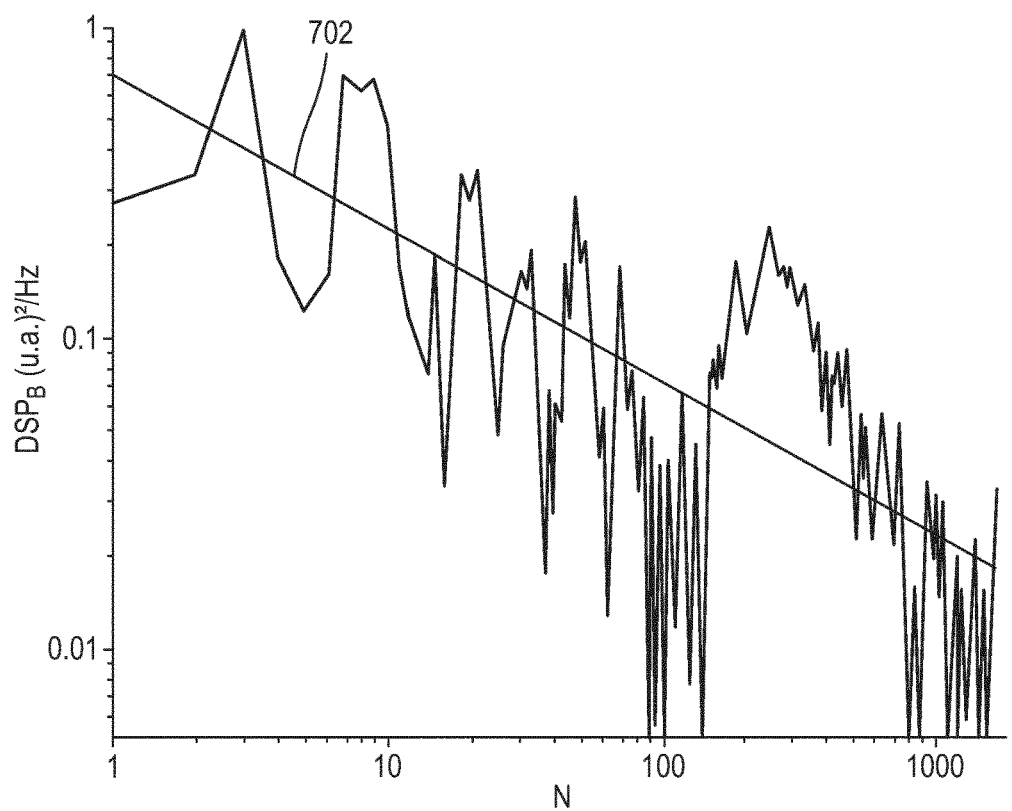
FIG. 7 represents, as a function of the number of pieces used in the calculation of the average, the variation in the noise level in the spectral power of the signal of FIG. 6.

Similarly to the first example described, the spectral density of the noise $DSP_B$ as a function of the number of averaged pieces N is illustrated in FIG. 7. In this second example, the spectral density of the noise $DSP_B$ decreases by a ratio equal to around 40. The decreasing line 702 shows the theoretical decrease in the noise level which is proportional to $1/\sqrt{N}$.

Naturally the invention is not limited to the embodiment described with reference to the figures and alternatives could be envisaged without going beyond the scope of the invention. To calculate the power spectrum of a piece of the modulated signal a(t), instead of multiplying the first values of the upper sideband by the second values of the lower sideband of the spectrum $A_k$ of this piece, it is notably possible to calculate a unilateral spectrum by adding together the first values of the upper sideband BLS and the second values of the lower sideband BLI of the spectrum $A_k$ of this piece then squaring the unilateral spectrum. From a mathematical viewpoint, the average power spectrum $P_M$ is then calculated according to the following equation:

$$P_M(\delta f) = \langle (A_k(f_0 - \delta f) + A_k(f_0 + \delta f))^2 \rangle \qquad (5)$$

where $f_0$ is the carrier frequency, $\delta f$ is any frequency, $A_k$ is the Fourier transform of a piece k of the modulated signal a(t), k being an integer comprised between 1 and N, N being the number of pieces of the modulated signal a(t) acquired, and the chevrons $\langle \rangle$ symbolise the calculation of the average of the power spectra of the N pieces of the modulated signal a(t).

In another alternative embodiment, the means of synchronous detection are adjusted so as to obtain at the output two signals g(t) and h(t) having a phase difference of 45° with the carrier signal c(t), these two signals g(t) and h(t) being defined by the following equations:

$$g(t) = \frac{i(t) + q(t)}{\sqrt{2}}; \quad h(t) = \frac{i(t) - q(t)}{\sqrt{2}}$$

where i(t) and q(t) are respectively the signals in phase and in phase quadrature with the carrier signal c(t). The average power spectrum $P_M$ is then calculated by averaging the product of the spectra of the signals g(t) and h(t), according to the following equation:

$$P_M(\delta f) = \langle G_k(\delta f) \cdot H_k(\delta f) \rangle \qquad (6)$$

where $\delta f$ is any frequency, $G_k$ and $H_k$ are the Fourier transforms of the signals g(t) and h(t), k being an integer comprised between 1 and N, N being the number of pieces of the signals g(t) and h(t) acquired, and the chevrons $\langle \rangle$ symbolise the calculation of the average of the power spectra of the N pieces of the signals g(t) and h(t).

The invention claimed is:

1. A method for reducing noise in a modulated electrical signal having a carrier frequency, the method being implemented with a noise reduction device that includes an analogue-digital converter and a computer having a non-transitory memory encoded with computer program instructions for calculating a spectrum of a modulated signal, a power spectrum of the modulated signal and an average of the power spectrum, the method comprising:
   receiving, by the noise reduction device, the modulated electrical signal;
   acquiring, with said analogue-digital converter, in the time domain the modulated signal so as to obtain a plurality of pieces of the modulated signal;
   calculating, by transformation in the frequency domain, a spectrum of each piece of the modulated signal, the spectrum comprising an upper sideband extending over a range of frequencies greater than the carrier frequency, and a lower sideband extending over a range of frequencies lower than the carrier frequency, said calculating of the spectrum of each piece of the modulated signal being carried out with said computer by executing the computer program instructions encoded in said non-transitory memory;

calculating a power spectrum for each piece of the modulated signal, the power spectrum comprising a set of values, each value of the power spectrum being calculated from a first value of the upper sideband and from a second value of the lower sideband, the first and second values being symmetrical with respect to the carrier frequency, said calculating of the power spectrum for each piece of the modulated signal being carried out with said computer by executing the computer program instructions encoded in said non-transitory memory;

calculating an average power spectrum by averaging the power spectra to reduce a noise part of the modulated electrical signal, said calculating of the average power spectrum being carried out with said computer by executing the computer program instructions encoded in said non-transitory memory, and outputting, by the noise reduction device, the average power spectrum of the modulated electrical signal in which the noise part of the modulated electrical signal has been reduced.

2. The method according to claim 1, wherein each value of the power spectrum is calculated by multiplication of the first value of the upper sideband and the second value of the lower sideband.

3. The method according to claim 1, wherein each value of the power spectrum is calculated by squaring a result of the sum of the first and second values.

4. The method according to claim 1, comprising a step of synchronous detection of the modulated signal.

5. The method according to claim 1, wherein the modulated signal has a plurality of carrier frequencies, the spectrum of each piece of the modulated signal comprising an upper sideband and a lower sideband for each carrier frequency of the modulated signal, a plurality of power spectra being calculated for each piece of the modulated signal from the values belonging to two distinct sidebands of the spectrum of said each piece of the modulated signal.

6. The method according to claim 1, wherein the modulated signal results from an amplitude modulation, a frequency modulation or a phase modulation.

7. The method according to claim 1, wherein the modulated electrical signal is a signal of a capacitive, piezoelectric or optical sensor.

8. A noise reduction device for reducing noise in a modulated electrical signal having a carrier frequency, the noise reduction device comprising:

an input to receive the modulated electrical signal;

an analogue-digital converter adapted to acquire in the time domain the modulated electrical signal received by the noise reduction device so as to obtain a plurality of pieces of the modulated signal;

a computer having a non-transitory memory encoded with computer program instructions for:

calculating, by transformation in the frequency domain, a spectrum of each piece of the modulated signal, the spectrum comprising an upper sideband extending over a range of frequencies greater than the carrier frequency, and a lower sideband extending over a range of frequencies lower than the carrier frequency;

calculating a power spectrum for each piece of the modulated signal, the power spectrum comprising a set of values, each value of the power spectrum being calculated from a first value of the upper sideband and from a second value of the lower sideband, the first and second values being symmetrical with respect to the carrier frequency; and calculating an average power spectrum by averaging the power spectra to reduce a noise part of the modulated electrical signal, and an output to output the average power spectrum of the modulated electrical signal in which the noise part of the modulated electrical signal has been reduced.

9. The device according to claim 8, comprising a synchronous detection device including a first input to receive the modulated electrical signal, a first output to output to the analogue-digital converter a signal in phase with a carrier signal of said modulated electrical signal and a second output to output to the analogue-digital converter a signal in phase quadrature with the carrier signal.

10. The device according to claim 8, wherein the analogue-digital converter comprises several acquisition paths, each acquisition path being dedicated to a carrier frequency of the modulated signal.

* * * * *